(12) United States Patent
Bonne et al.

(10) Patent No.: US 11,521,298 B2
(45) Date of Patent: Dec. 6, 2022

(54) LARGE LED ARRAY WITH REDUCED DATA MANAGEMENT

(71) Applicant: Lumileds LLC, San Jose, CA (US)

(72) Inventors: Ronald Bonne, Plainfield, IL (US);
Jyoti Kiron Bhardwaj, Cupertino, CA (US)

(73) Assignee: Lumileds LLC, San Jose, CA (US)

(*) Notice: Subject to any disclaimer, the term of this patent is extended or adjusted under 35 U.S.C. 154(b) by 551 days.

(21) Appl. No.: 16/456,852

(22) Filed: Jun. 28, 2019

(65) Prior Publication Data

US 2020/0084848 A1 Mar. 12, 2020

Related U.S. Application Data

(60) Provisional application No. 62/729,284, filed on Sep. 10, 2018.

(30) Foreign Application Priority Data

Oct. 24, 2018 (EP) ..................................... 18202319

(51) Int. Cl.

| | | |
|---|---|---|
| *G06T 3/40* | (2006.01) | |
| *G09G 3/20* | (2006.01) | |
| *H05B 45/50* | (2022.01) | |
| *F21S 41/141* | (2018.01) | |
| *H05B 45/00* | (2022.01) | |

(Continued)

(52) U.S. Cl.
CPC .......... *G06T 3/4023* (2013.01); *F21S 41/141* (2018.01); *F21V 23/0478* (2013.01); *G09G 3/2003* (2013.01); *G09G 3/2088* (2013.01); *H05B 45/00* (2020.01); *H05B 45/50* (2020.01); *H05B 47/105* (2020.01); *G06T 2200/00* (2013.01); *G06T 2200/28* (2013.01); *G06T 2200/32* (2013.01)

(58) Field of Classification Search
CPC ............... G06T 3/4023; G06T 2200/00; G06T 2200/28; F21S 41/141; H05B 45/00; F21V 23/0478

See application file for complete search history.

(56) References Cited

U.S. PATENT DOCUMENTS 5,184,114 A 2/1993 Brown
5,612,728 A 3/1997 Kun et al.
(Continued)

FOREIGN PATENT DOCUMENTS

CN 204077513 U 1/2015
DE 102015016375 A1 6/2017
(Continued)

OTHER PUBLICATIONS

U.S. Appl. No. 62/888,246, filed Aug. 16, 2019, Zhi Hua Song.
(Continued)

*Primary Examiner* — Anne M Hines
(74) *Attorney, Agent, or Firm* — Schwegman Lundberg & Woessner, P.A.

(57) ABSTRACT

An LED controller system includes an LED controller including an image frame buffer able to receive image data. A sensor processing module is used to receive and process sensor data and a decision module is used to determine actions taken in response to processed sensor data. An image creation module is used to create images to be sent to the image frame buffer of the LED controller.

20 Claims, 6 Drawing Sheets

(51) Int. Cl.
*H05B 47/105* (2020.01)
*F21V 23/04* (2006.01)

(56) References Cited

U.S. PATENT DOCUMENTS

| | | |
|---|---|---|
| 6,611,610 B1 | 8/2003 | Stam et al. |
| 6,728,393 B2 | 4/2004 | Stam et al. |
| 6,933,956 B2 | 8/2005 | Sato et al. |
| 7,432,967 B2 | 10/2008 | Bechtel et al. |
| 7,526,103 B2 | 4/2009 | Schofield et al. |
| 7,542,861 B1 | 6/2009 | You et al. |
| 9,318,069 B2 | 4/2016 | Nambi et al. |
| 9,849,827 B2 | 12/2017 | Uchida et al. |
| 9,944,222 B2 | 4/2018 | Tsuzuki |
| 10,148,938 B2 | 12/2018 | Nagasaki et al. |
| 10,189,398 B2 | 1/2019 | Jung et al. |
| 10,219,348 B1 | 2/2019 | Chung |
| 10,471,887 B2 | 11/2019 | Jung et al. |
| 10,651,357 B2 | 5/2020 | Andrews |
| 2001/0026646 A1 | 10/2001 | Morita et al. |
| 2002/0142504 A1 | 10/2002 | Feldman et al. |
| 2002/0171617 A1 | 11/2002 | Fuller |
| 2002/0186192 A1 | 12/2002 | Maruoka et al. |
| 2003/0038983 A1 | 2/2003 | Tanabe et al. |
| 2003/0058262 A1 | 3/2003 | Sato et al. |
| 2003/0222893 A1 | 12/2003 | Koester et al. |
| 2004/0095184 A1 | 5/2004 | Oka et al. |
| 2004/0114379 A1* | 6/2004 | Miller ............... B60Q 1/085 362/465 |
| 2004/0119667 A1 | 6/2004 | Yang |
| 2004/0129887 A1 | 7/2004 | Vydrin et al. |
| 2004/0252874 A1 | 12/2004 | Yamazaki |
| 2005/0029872 A1 | 2/2005 | Ehrman et al. |
| 2006/0007059 A1 | 1/2006 | Bell |
| 2006/0017688 A1 | 1/2006 | Hohmann et al. |
| 2006/0237636 A1 | 10/2006 | Lyons et al. |
| 2006/0290770 A1 | 12/2006 | Leblanc |
| 2007/0242337 A1 | 10/2007 | Bradley |
| 2008/0129206 A1 | 6/2008 | Stam et al. |
| 2009/0040152 A1 | 2/2009 | Scheibe |
| 2009/0040775 A1 | 2/2009 | Scheibe |
| 2009/0322429 A1 | 12/2009 | Ivanov et al. |
| 2010/0073358 A1 | 3/2010 | Ozaki |
| 2010/0097525 A1 | 4/2010 | Mino |
| 2010/0259182 A1 | 10/2010 | Man et al. |
| 2010/0301777 A1 | 12/2010 | Kraemer |
| 2011/0012891 A1 | 1/2011 | Cheng et al. |
| 2011/0062872 A1 | 3/2011 | Jin et al. |
| 2012/0286135 A1 | 11/2012 | Gong et al. |
| 2012/0287144 A1 | 11/2012 | Gandhi et al. |
| 2012/0306370 A1 | 12/2012 | Ven et al. |
| 2013/0082604 A1 | 4/2013 | Williams et al. |
| 2014/0267329 A1 | 9/2014 | Lee et al. |
| 2015/0138212 A1 | 5/2015 | Bae et al. |
| 2015/0151671 A1* | 6/2015 | Refior ............... H05B 45/10 315/297 |
| 2015/0186098 A1 | 7/2015 | Hall |
| 2015/0204512 A1 | 7/2015 | Chen et al. |
| 2016/0081028 A1 | 3/2016 | Chang et al. |
| 2016/0081148 A1 | 3/2016 | Liang et al. |
| 2016/0104418 A1 | 4/2016 | Keum et al. |
| 2016/0155406 A1 | 6/2016 | Lee |
| 2016/0275919 A1 | 9/2016 | Lawrence et al. |
| 2016/0302270 A1 | 10/2016 | Wang |
| 2016/0335957 A1 | 11/2016 | Fu et al. |
| 2016/0345392 A1 | 11/2016 | Scenini et al. |
| 2017/0243532 A1 | 8/2017 | Huang et al. |
| 2018/0074199 A1 | 3/2018 | Lin et al. |
| 2018/0079352 A1 | 3/2018 | Dalal |
| 2018/0263098 A1 | 9/2018 | Recker et al. |
| 2018/0290584 A1 | 10/2018 | Jung et al. |
| 2019/0013307 A1 | 1/2019 | Wu et al. |
| 2019/0057643 A1 | 2/2019 | Bae et al. |
| 2019/0132917 A1 | 5/2019 | Veenstra et al. |
| 2019/0189879 A1 | 6/2019 | Tandon et al. |
| 2020/0079278 A1 | 3/2020 | Bonne et al. |
| 2020/0079280 A1 | 3/2020 | Bonne et al. |
| 2020/0082503 A1 | 3/2020 | Bonne et al. |
| 2020/0082749 A1 | 3/2020 | Bonne |
| 2020/0084848 A1 | 3/2020 | Bonne et al. |
| 2020/0084853 A1 | 3/2020 | Bonne et al. |
| 2020/0084854 A1 | 3/2020 | Bonne et al. |
| 2020/0084868 A1 | 3/2020 | Bonne |
| 2020/0128640 A1 | 4/2020 | Van Voorst |

FOREIGN PATENT DOCUMENTS

| | | |
|---|---|---|
| EP | 2626851 A2 | 8/2013 |
| JP | 2002247614 A | 8/2002 |
| JP | 2004-210129 A | 7/2004 |
| JP | 2010-529932 A | 9/2010 |
| KR | 101846329 B1 | 4/2018 |
| TW | 201110811 A | 3/2011 |
| TW | 202019238 A | 5/2020 |
| WO | WO-2008/154736 A1 | 12/2008 |
| WO | 2009140963 A1 | 11/2009 |
| WO | 2013066017 A1 | 5/2013 |
| WO | 2014062425 A1 | 4/2014 |
| WO | 2020053716 A1 | 3/2020 |
| WO | 2020053717 A1 | 3/2020 |
| WO | 2020053718 A2 | 3/2020 |
| WO | 2020053719 A1 | 3/2020 |

OTHER PUBLICATIONS

U.S. Appl. No. 62/890,853, filed Aug. 23, 2019, Toni Lopez.
U.S. Appl. No. 62/938,479, filed Nov. 21, 2019, Zhi Hua Song.
U.S. Appl. No. 62/938,527, filed Nov. 21, 2019, Zhi Hua Song.
U.S. Appl. No. 62/941,123, filed Nov. 27, 2019, Ronald Johannes Bonne.
U.S. Appl. No. 62/951,199, filed Dec. 20, 2019, Zhi Hua Song.
European Search Report corresponding to EP18201763; dated Feb. 8, 2019, 1 page.
European Search Report corresponding to EP18203445, dated Apr. 5, 2019, 1 page.
International Search Report and Written Opinion in International Patent Application No. PCT/IB2019/057507 dated Apr. 16, 2020, 31 pages.
International Search Report corresponding to PCT/IB2019/057508, dated Nov. 4, 2019, 4 pages.
International Search Report, PCT/IB2019/057504, dated Nov. 11, 2019, 3 pages.
USPTO Non-Final Office Action in U.S. Appl. No. 16/456,868 dated Apr. 1, 2020, 8 pages.
USPTO Non-Final Office Action dated Feb. 20, 2020 for. U.S. Appl. No. 16/456,858; 10 pages.
USPTO Non-Final Office Action dated Mar. 6, 2020 for. U.S. Appl. No. 16/456,862; 23 pages.
USPTO Notice of Allowance in U.S. Appl. No. 16/456,835 dated Jan. 27, 2020, 8 pages.
USPTO office action issued in U.S. Appl. No. 16/456,844 dated Feb. 5, 2020; 16 pages.
Written Opinion of the International Searching Authority corresponding to PCT/IB2019/057508, dated Nov. 4, 2019, 10 pages.
Written Opinion of the International Searching Authority, PCT/IB2019/057504, dated Nov. 11, 2019, 5 pages.
Taiwanese Notice of Allowance dated Aug. 26, 2020 for ROC (Taiwan) Patent Application No. 108123755; 3 pages total.
USPTO Final Office Action in U.S. Appl. No. 16/456,862 dated Sep. 14, 2020, 15 pages.
USPTO Notice of Allowance in U.S. Appl. No. 16/456,858 dated Aug. 28, 2020, 6 pages.
"U.S. Appl. No. 16/456,849, Examiner Interview Summary dated May 4, 2021", 4 pgs.
"U.S. Appl. No. 16/456,849, Response filed Jun. 7, 2021 to Final Office Action dated Apr. 14, 2021", 15 pgs.
International Search Report corresponding to PCT/IB2019/05706, 2 pages, dated Oct. 31, 2019.

(56) References Cited

OTHER PUBLICATIONS

Taiwanese Office Action dated Jun. 29, 2020 for ROC (Taiwan) Patent Application No. 108123758; 11 pages total.
Taiwanese Office Action dated May 13, 2020 for ROC (Taiwan) Patent Application No. 108123755; with English translation; 18 pages total.
Taiwanese Office Action dated May 25, 2020 for corresponding ROC (Taiwan) Patent Application No. 108123756; with English translation; 48 pages total.
USPTO Non-Final Office Action dated Jun. 11, 2020 for U.S. Appl. No. 16/456,835; 19 pages.
"U.S. Appl. No. 16/456,835, Notice of Allowance dated Oct. 8, 2020", 9 pgs.
"U.S. Appl. No. 16/456,849, Non Final Office Action dated Oct. 29, 2020", 11 pgs.
"U.S. Appl. No. 16/456,849, Preliminary Amendment filed May 29, 2020", 3 pgs.
"U.S. Appl. No. 16/456,849, Response filed Jan. 12, 2021 to Non Final Office Action dated Oct. 29, 2020", 9 pgs.
"U.S. Appl. No. 16/456,868, Final Office Action dated Oct. 15, 2020", 12 pgs.
"International Application Serial No. PCT/IB2019/057506, Written Opinion dated Oct. 31, 2019", 10 pgs.
"Taiwanese Application Serial No. 108123755, Response filed Aug. 14, 2020 to Office Action dated May 13, 2020", (w/ English Translation), (dated Aug. 14, 2020), 14 pgs.
"Taiwanese Application Serial No. 108123756, Decision to Grant dated Nov. 6, 2020", (w/ English Translation), 6 pgs.
"Taiwanese Application Serial No. 108123756, Response filed Aug. 26, 2020 to Office Action dated May 25, 2020", (w/ English Translation), 15 pgs.
"Taiwanese Application Serial No. 108123758, Response filed Sep. 29, 2020 to Office Action dated Jun. 29, 2020", (w/ English Translation), 35 pgs.
European Search Report corresponding to EP18202319, dated Jan. 29, 2019, 1 page.
USPTO Non-Final Office Action dated Aug. 5, 2020 for U.S. Appl. No. 16/456,874; 6 pages.
USPTO Notice of Allowance in U.S. Appl. No. 16/456,844 dated Aug. 6, 2020, 24 pages.
"U.S. Appl. No. 16/456,849, Final Office Action dated Apr. 14, 2021", 13 pgs.
"International Application Serial No. PCT/IB2019/057506, International Preliminary Report on Patentability dated Mar. 25, 2021", 12 pgs.
"TPS99000-Q1 System Management and Illumination Controller", Texas Instruments, (Apr. 2019), 83 pgs.
"Japanese Application Serial No. 2021-513237, Voluntary Amendment filed May 6, 2021", (w/ English Claims), 7 pgs.
"U.S. Appl. No. 16/456,849, Notice of Allowance dated Jul. 7, 2021", 10 pgs.
"Japanese Application Serial No. 2021-513237, Notification of Reasons for Refusal dated Jul. 5, 2022", (w/ English Translation), 17 pgs.

* cited by examiner

LARGE LED ARRAY WITH REDUCED DATA MANAGEMENT

CROSS REFERENCE TO RELATED APPLICATIONS

This application claims benefit of priority to European Patent Application No. 18202319.2 filed Oct. 24, 2018 and to U.S. Provisional Patent Application No. 62/729,284 filed Sep. 10, 2018 each of which is incorporated herein by reference in its entirety. Further, this application is related to co-pending U.S. Non-provisional patent application Ser. No. 16/456,849 filed Jun. 28, 2019.

TECHNICAL FIELD

The present disclosure relates generally to a system providing dynamic lighting control to LED arrays. In certain embodiments, the system can include a connected and individually addressable LED pixel array able to provide intensity and spatially modulated light projection suitable for adaptive lighting systems supporting video refresh rates or greater.

BACKGROUND

While pixel arrays of LEDs with supporting CMOS circuitry have been used, practical implementations suitable for commercial use can face severe manufacture, power, and data management problems. Individual light intensity of thousands of emitting pixels may need to be controlled at refresh rates of 30-60 Hz. Power fluctuations need to be controlled, and room found for large number of thick power traces extending through a hybrid silicon CMOS/GaN assembly. Manufacturable systems able to reliably handle such power at high data refresh rates are needed.

SUMMARY

In one embodiment, a LED controller includes a power distribution module and an interface to an external data bus. An image frame buffer is connected to the interface to receive image data. A separate logic module is connected to the interface and configured to modify image frame buffer output signals sent to an LED pixel array connected to the image frame buffer. The LED pixel array can project light according to a pattern and intensity defined at least in part by the image held in the image frame buffer.

In another embodiment, a standby image buffer is connected to the image frame buffer to hold a default image. In another embodiment a pulse width modulator is connected between the image frame buffer and the LED pixel array.

In some embodiments, the image frame buffer can refresh held images at 60 Hz or greater speed. Image refresh data can be provided externally over a serial interface.

Various applications can benefit from a LED controller system able to support high data rates, default image presentation, and larger LED pixel arrays of hundreds to thousands of independently addressable pixels. These applications can include but are not limited to architectural lighting, projected light displays, street lighting, or vehicle headlamps.

In another embodiment, an LED controller system includes an LED controller including an image frame buffer able to receive image data. A sensor processing module is used to receive and process sensor data and a decision module is used to determine actions taken in response to processed sensor data. An image creation module is used to create images to be sent to the image frame buffer of the LED controller.

In another embodiment, a method of interacting with an LED controller system, includes the steps of receiving image data using an LED controller including an image frame buffer. Sensor data is received and processed, with the output being used to determine actions using a decision module. Images are created with an image creation module and sent to the image frame buffer of the LED controller.

DETAILED DESCRIPTION

Figure 1:
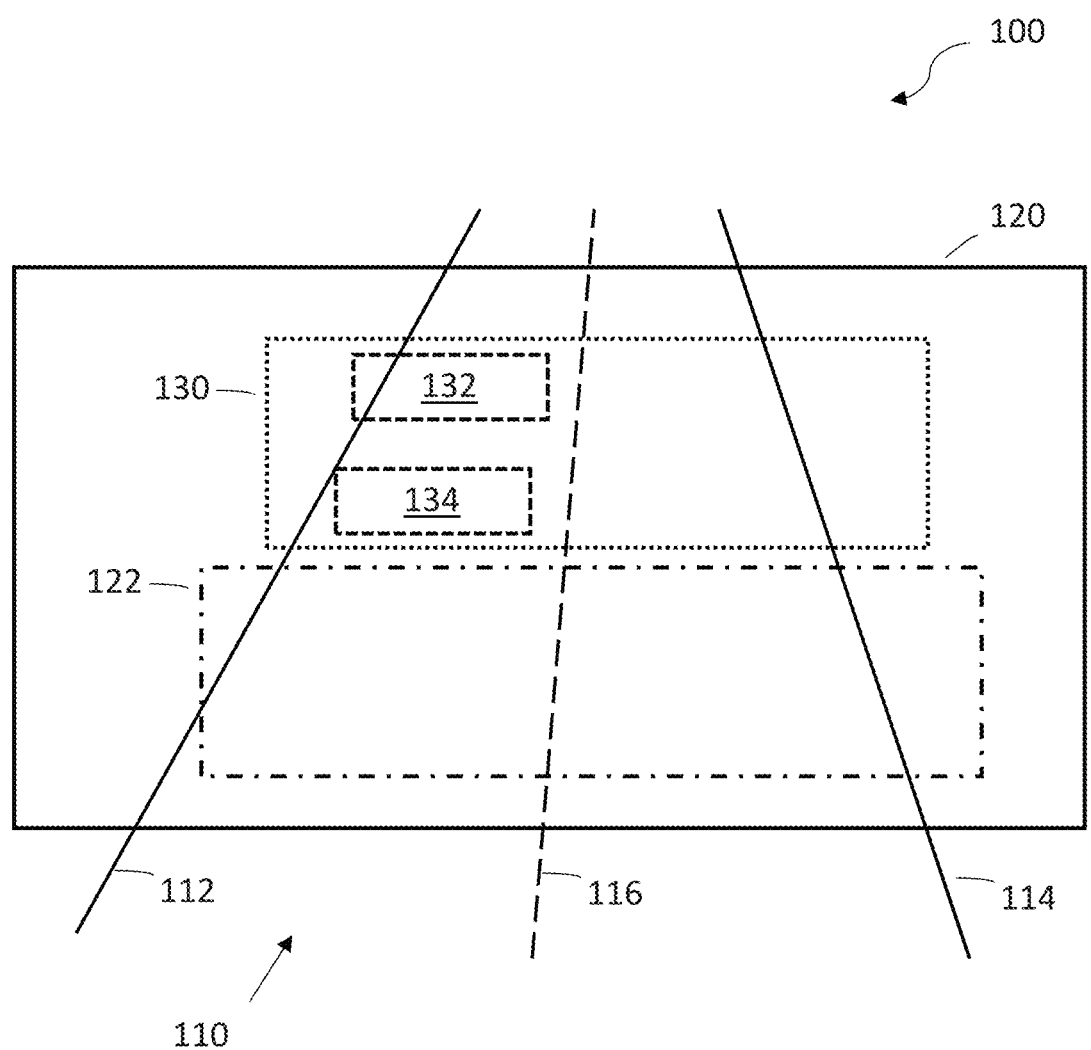
FIG. 1 is a diagram illustrating illumination of a road in discrete sectors using an active headlamp.

Light emitting pixel arrays may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. The emitted light may be based at least in part on received sensor data and may be used for optical wireless communications. Associated optics may be distinct at a pixel, pixel block, or device level. An example light emitting pixel array may include a device having a commonly controlled central block of high intensity pixels with an associated common optic, whereas edge pixels may have individual optics. Common applications supported by light emitting pixel arrays include video lighting, automotive headlights, architectural and area illumination, street lighting, and informational displays.

Light emitting pixel arrays may be used to selectively and adaptively illuminate buildings or areas for improved visual display or to reduce lighting costs. In addition, light emitting pixel arrays may be used to project media facades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

Street lighting is an important application that may greatly benefit from use of light emitting pixel arrays. A single type of light emitting array may be used to mimic various street light types, allowing, for example, switching between a Type I linear street light and a Type IV semicircular street light by appropriate activation or deactivation of selected pixels. In addition, street lighting costs may be lowered by adjusting light beam intensity or distribution according to environmental conditions or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Light emitting arrays are also well suited for supporting applications requiring direct or projected displays. For example, warning, emergency, or informational signs may all be displayed or projected using light emitting arrays. This allows, for example, color changing or flashing exit signs to be projected. If a light emitting array is composed of a large number of pixels, textual or numerical information may be presented. Directional arrows or similar indicators may also be provided.

Vehicle headlamps are a light emitting array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

One high value application for light emitting arrays is illustrated with respect to FIG. 1, which shows potential roadway illumination pattern 100 for a vehicle headlamp system illuminating a region 120 in front of a vehicle. As illustrated, a roadway 110 includes a left edge 112, a right edge 114, and a centerline 116. In this example, two major regions are illuminated—a downward directed statically illuminated region 122 and a dynamically illuminated region 130. Light intensity within region 130 can be dynamically controlled. For example, as an oncoming vehicle (not shown) traveling between centerline 116 and left edge 112 moves into a subregion 132, light intensity can be reduced or shut off completely. As the oncoming vehicle moves toward subregion 134, a series of subregions (not shown) can be defined to also have reduced light intensity, reducing the chance of unsafe dazzle or glare. As will be appreciated, in other embodiments, light intensity can be increased to accentuate road signs or pedestrians, or spatial illumination patterns adjusted to allow, for example, dynamic light tracking of curved roadways.

Figure 2:
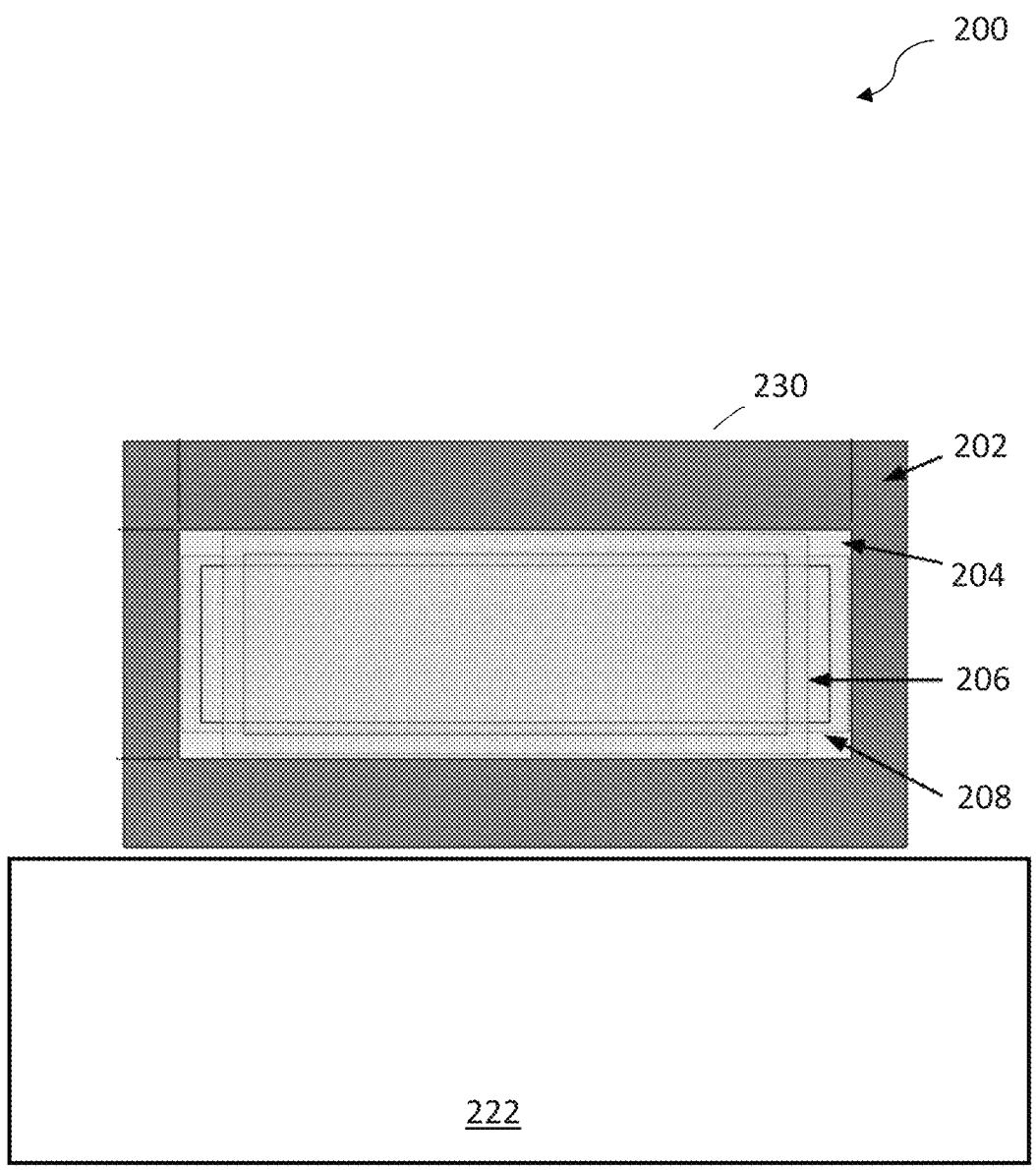
FIG. 2 illustrates a dynamic pixel addressable lighting module positioned adjacent to a static lighting module.

FIG. 2 illustrates a positioning of lighting modules 200 able to provide a lighting pattern such as discussed with respect to FIG. 1. An LED light module 222 can include LEDS, alone or in conjunction with primary or secondary optics, including lenses or reflectors. To reduce overall data management requirements, the light module 222 can be limited to on/off functionality or switching between relatively few light intensity levels. Pixel level control of light intensity is not necessarily supported.

Positioned adjacent to LED light module 22 is an active LED array 230. The LED array includes a CMOS die 202, with a pixel area 204 and alternatively selectable LED areas 206 and 208. The pixel area 204 can have 104 rows and 304 columns, for a total of 31,616 pixels distributed over an area of 12.2 by 4.16 millimeters. The selectable LED areas 206 and 208 allow for differing aspect ratios suitable for different vehicle headlamps or applications to be selected. For example, in one embodiment selectable LED area 206 can have a 1:3 aspect ratio with 82 rows and 246 columns, for a total of 20,172 pixels distributed over an area of 10.6 by 4 millimeters. Alternatively, selectable LED area 208 can have a 1:4 aspect ratio with 71 rows and 284 columns, for a total of 20,164 pixels distributed over an area of 12.1 by 3.2 millimeters. In one embodiment, pixels can be actively managed to have a 10-bit intensity range and a refresh rate of between 30 and 100 Hz, with a typical operational refresh rate of 60 Hz or greater.

Figure 3A:
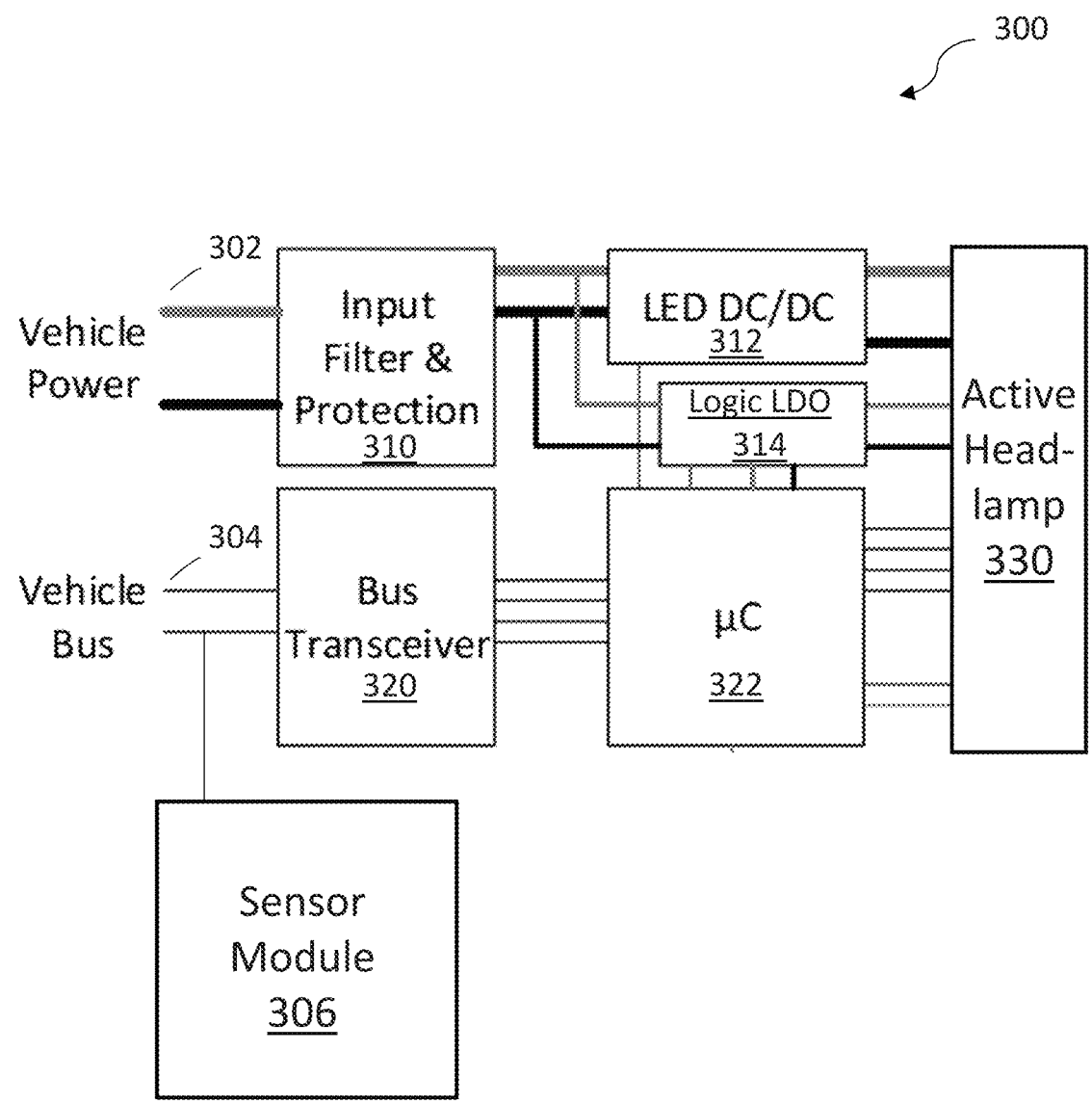
FIG. 3A is one embodiment of a vehicle headlamp system for controlling an active headlamp.

FIG. 3A illustrates an embodiment of a vehicle headlamp system 300 including a vehicle supported power (302) and control system including a data bus (304). A sensor module 306 can be connected to the data bus 304 to provide data related to environment conditions (e.g. time of day, rain, fog, ambient light levels, etc), vehicle condition (parked, in-motion, speed, direction), or presence/position of other vehicles or pedestrians. A separate headlamp controller 330 can be connected to the vehicle supported power and control system.

The vehicle headlamp system 300 can include a power input filter and control module 310. The module 310 can support various filters to reduce conducted emissions and provide power immunity. Electrostatic discharge (ESD) protection, load-dump protection, alternator field decay protection, and reverse polarity protection can also be provided by module 310.

Filtered power can be provided to a LED DC/DC module 312. Module 312 can be used only for powering LEDs, and typically has an input voltage of between 7 and 18 volts, with a nominal 13.2 volts. Output voltage can be set to be slightly higher (e.g. 0.3 volts) than LED array max voltage as determined by factory or local calibration, and operating condition adjustments due to load, temperature or other factors.

Filtered power is also provided to a logic LDO module 314 that can be used to power microcontroller 322 or CMOS logic in the active headlamp 330.

The vehicle headlamp system 300 can also include a bus transceiver 320 (e.g. with a UART or SPI interface) connected to microcontroller 322. The microcontroller 322 can translate vehicle input based on or including data from the sensor module 306. The translated vehicle input can include a video signal that is transferable to an image buffer in the active headlamp module 324. In addition, the microcontroller 322 can load default image frames and test for open/short pixels during startup. In one embodiment, a SPI Interface loads an image buffer in CMOS. Image frames can be full frame, differential or partial. Other microcontroller 322 features can include control interface monitors of CMOS status, including die temperature, as well as logic LDO output. In some embodiments, LED DC/DC output can be dynamically controlled to minimize headroom. In addition to providing image frame data, other headlamp functions such as complementary use in conjunction with side marker or turn signal lights, and/or activation of daytime running lights can also be controlled.

Figure 3B:
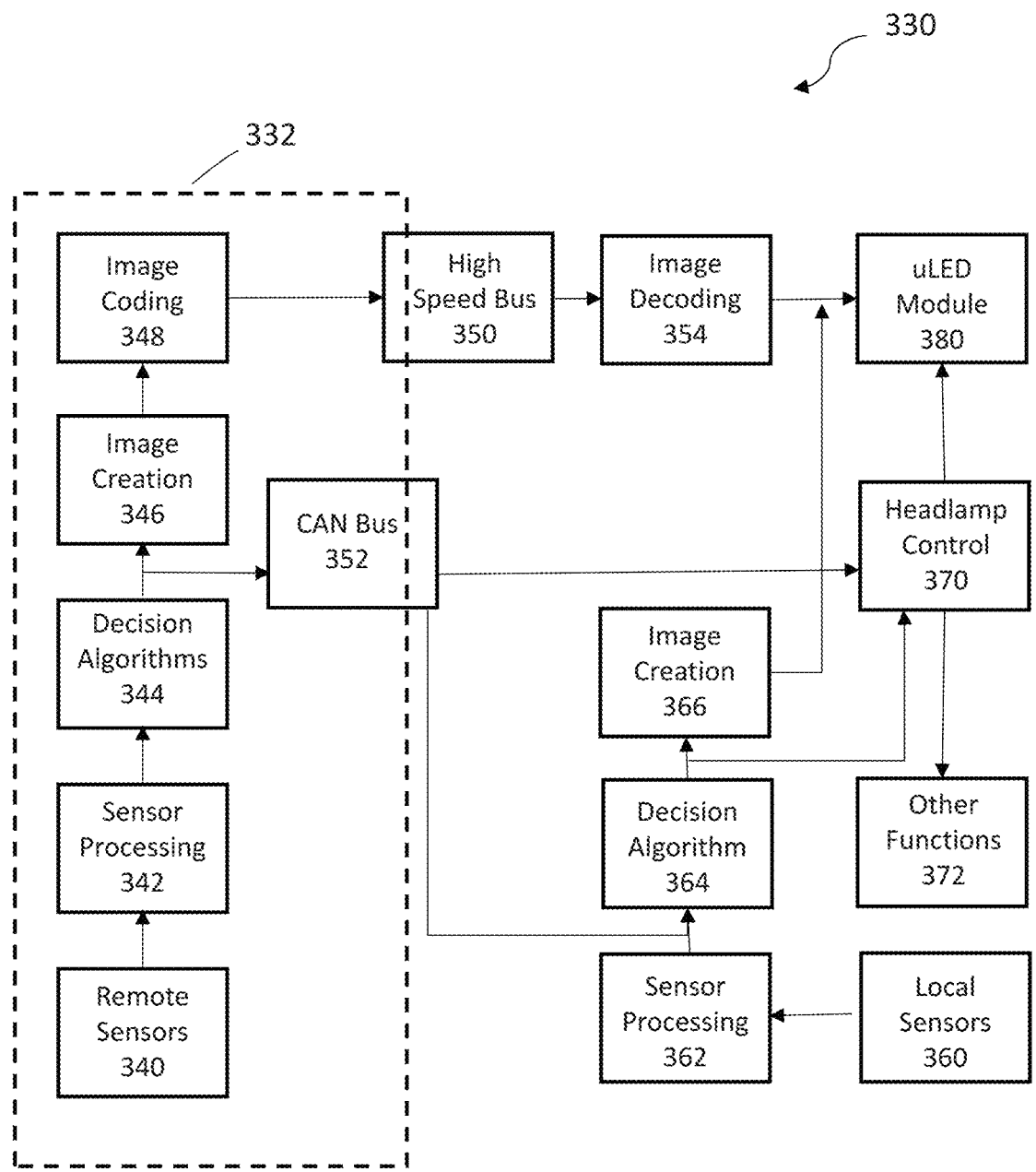
FIG. 3B is one embodiment of a vehicle headlamp system for controlling an active headlamp with connections to vehicle processing output.

FIG. 3B illustrates one embodiment of various components and modules of a vehicle headlamp system 330 capable of accepting vehicle sensor inputs and commands, as well as commands based on headlamp or locally mounted sensors. As seen in FIG. 3B, vehicle mounted systems can include remote sensors 340 and electronic processing modules capable of sensor processing 342. Processed sensor data can be input to various decision algorithms in a decision algorithm module 344 that result in command instructions or pattern creation based at least in part on various sensor input conditions, for example, such as ambient light levels, time of day, vehicle location, location of other vehicles, road conditions, or weather conditions. As will be appreciated, useful information for the decision algorithm module 344 can be provided from other sources as well, including connections to user smartphones, vehicle to vehicle wireless connections, or connection to remote data or information resources.

Based on the results of the decision algorithm module 344, image creation module 346 provides an image pattern that will ultimately provide an active illumination pattern to the vehicle headlamp that is dynamically adjustable and suitable for conditions. This created image pattern can be encoded for serial or other transmission scheme by image coding module 348 and sent over a high speed bus 350 to an image decoding module 354. Once decoded, the image pattern is provided to the uLED module 380 to drive activation and intensity of illumination pixels.

In some operational modes, the system 330 can be driven with default or simplified image patterns using instructions provided to a headlamp control module 370 via connection of the decision algorithm module 344 through a CAN bus 352. For example, an initial pattern on vehicle start may be a uniform, low light intensity pattern. In some embodiments, the headlamp control module can be used to drive other functions, including sensor activation or control.

In other possible operational modes, the system 330 can be driven with image patterns derived from local sensors or commands not requiring input via the CAN bus 352 or high speed bus 350. For example, local sensors 360 and electronic processing modules capable of sensor processing 362 can be used. Processed sensor data can be input to various decision algorithms in a decision algorithm module 364 that result in command instructions or pattern creation based at least in part on various sensor input conditions, for example, such as ambient light levels, time of day, vehicle location, location of other vehicles, road conditions, or weather conditions. As will be appreciated, like vehicle supported remote sensors 340, useful information for the decision algorithm module 364 can be provided from other sources as well, including connections to user smartphones, vehicle to vehicle wireless connections, or connection to remote data or information resources.

Based on the results of the decision algorithm module 364, image creation module 366 provides an image pattern that will ultimately provide an active illumination pattern to the vehicle headlamp that is dynamically adjustable and suitable for conditions. In some embodiments, this created image pattern does not require additional image coding/decoding steps but can be directly sent to the uLED module 380 to drive illumination of selected pixels.

Figure 4:
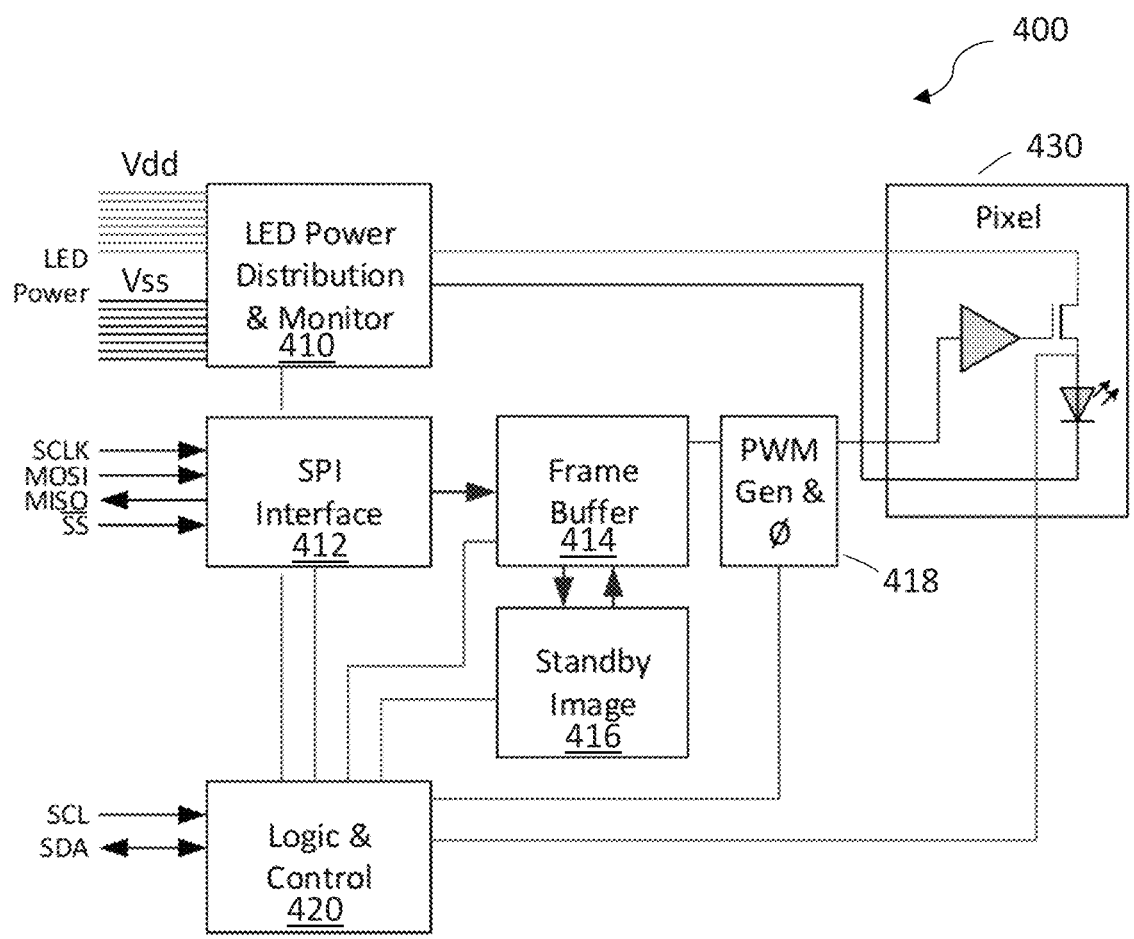
FIG. 4 is a schematic illustration of one embodiment of an active headlamp controller.

FIG. 4 illustrates one embodiment of various components and modules of an active headlamp system 400 such as described with respect to active headlamp 330 of FIG. 3. As illustrated, internal modules include an LED power distribution and monitor module 410 and a logic and control module 420.

Image or other data from the vehicle can arrive via an SPI interface 412. Successive images or video data can be stored in an image frame buffer 414. If no image data is available, one or more standby images held in a standby image buffer can be directed to the image frame buffer 414. Such standby images can include, for example, an intensity and spatial pattern consistent with legally allowed low beam headlamp radiation patterns of a vehicle.

In operation, pixels in the images are used to define response of corresponding LED pixels in the pixel module 430, with intensity and spatial modulation of LED pixels being based on the image(s). To reduce data rate issues, groups of pixels (e.g. 5×5 blocks) can be controlled as single blocks in some embodiments. High speed and high data rate operation is supported, with pixel values from successive images able to be loaded as successive frames in an image sequence at a rate between 30 Hz and 100 Hz, with 60 Hz being typical. In conjunction with a pulse width modulation module 418, each pixel in the pixel module can be operated to emit light in a pattern and with an intensity at least partially dependent on the image held in the image frame buffer 414.

In one embodiment, intensity can be separately controlled and adjusted by setting appropriate ramp times and pulse width for each LED pixel using logic and control module 420 and the pulse width modulation module 418. This allows staging of LED pixel activation to reduce power fluctuations, and to provide various pixel diagnostic functionality.

Figure 5:
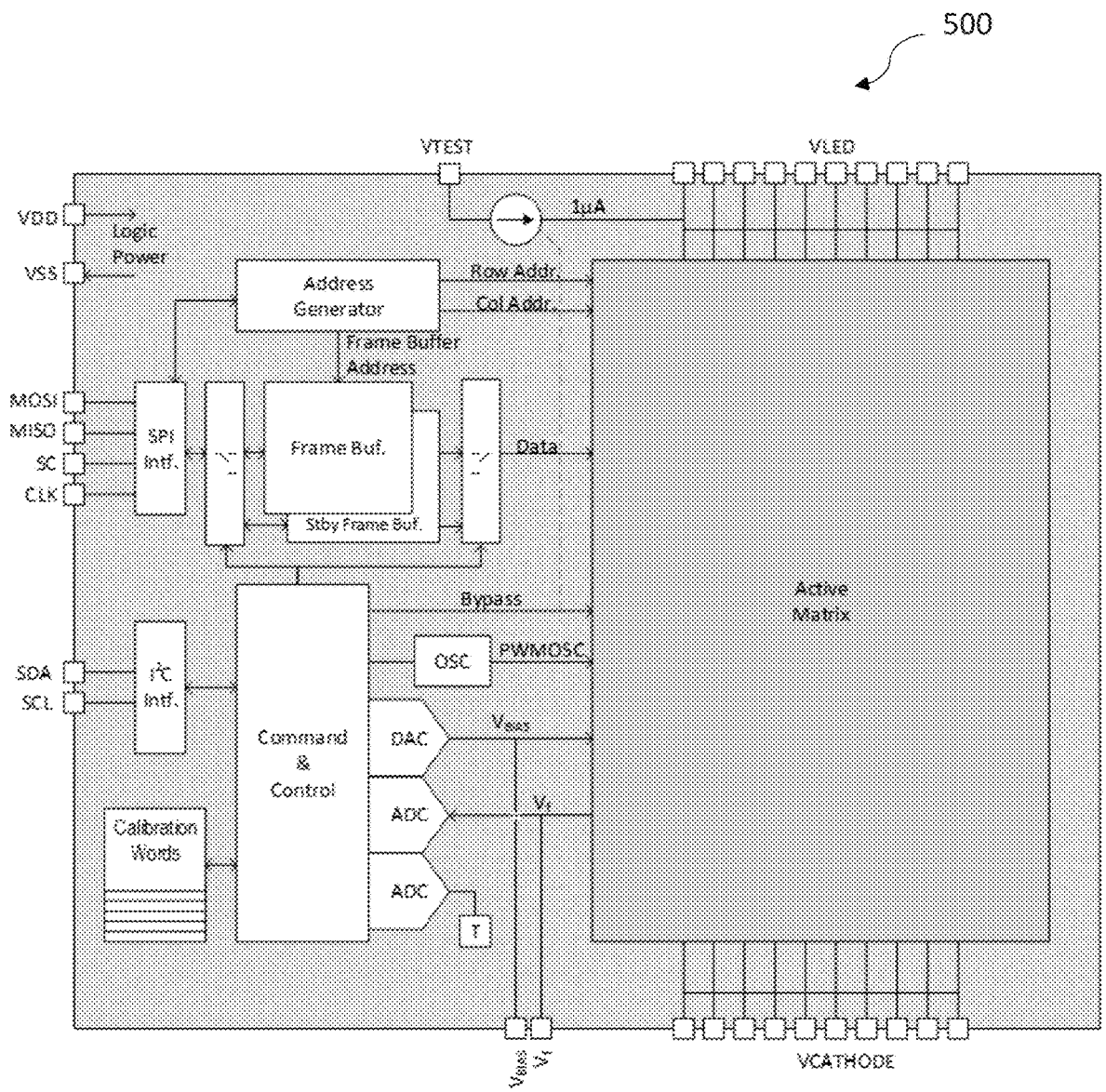
FIG. 5 is an illustration of a microcontroller assembly for an LED pixel array.

FIG. 5 illustrates a microcontroller assembly 500 for an LED pixel array. The assembly 500 can receive logic power via Vdd and Vss pins. An active matrix receives power for LED array control by multiple $V_{LED}$ and $V_{Cathode}$ pins. A Serial Peripheral Interface (SPI) can provide full duplex mode communication using a master-slave architecture with a single master. The master device originates the frame for reading and writing. Multiple slave devices are supported through selection with individual slave select (SS) lines. Input pins can include a Master Output Slave Input (MOSI), a Master Input Slave Output (MISO), a chip select (SC), and clock (CLK), all connected to the SPI interface.

In one embodiment, the SPI frame includes 2 stop bits (both "0"), 10 data bits, MSB first, 3 CRC bits (x3+x+1), a start 111b, and target 000b. Timing can be set per SafeSPI "in-frame" standards.

MOSI Field data can be as follows:
Frame 0: Header
Frame 1/2: Start Column Address [SCOL]
Frame 3/4: Start Row Address [SROW}
Frame 5/6: Number of Columns [NCOL]
Frame 7/8: Number of Rows [NROW]
Frame 9: Intensity pixel [SCOL, SROW]
Frame 10: Intensity pixel [SCOL+1, SROW]
Frame 9+NCOL: Intensity pixel [SCOL+NCOL, SROW]
Frame 9+NCOL+1: Intensity pixel [SCOL, SROW+1]
Frame 9+NCOL+NROW: Intensity pixel [SCOL+NCOL, SROW+NROW]

MISO Field data can include loopback of frame memory.

A field refresh rate at 60 Hz (60 full frames per second) is supported, as is a bit rate of at least 10 Mbps, and typically between 15-20 Mbps.

The SPI interface connects to an address generator, frame buffer, and a standby frame buffer. Pixels can have parameters set and signals or power modified (e.g. by power gating before input to the frame buffer, or after output from the frame buffer via pulse width modulation or power gating) by a command and control module. The SPI interface can be connected to an address generation module that in turn provides row and address information to the active matrix. The address generator module in turn can provide the frame buffer address to the frame buffer.

The command and control module can be externally controlled via an Inter-Integrated Circuit (I²C) serial bus. A clock (SCL) pin and data (SDA) pin with 7-bit addressing is supported.

The command and control module include a digital to analog converter (DAC) and two analog to digital converters (ADC). These are respectively used to set $V_{bias}$ for a connected active matrix, help determine maximum $V_f$, and determine system temperature. Also connected are an oscillator (OSC) to set the pulse width modulation oscillation (PWMOSC) frequency for the active matrix. A bypass line is also present to allow address of individual pixels or pixel blocks in the active matrix for diagnostic, calibration, or testing purposes.

In one embodiment, the command and control module can provide the following inputs and outputs:

Input to CMOS chip:
VBIAS: Sets voltage bias for LDO's.
GET_WORD[ . . . ]: Requests Output from CMOS.
TEST_M1: Run Pixel Test: LDO in bypass mode, sequentially addresses columns, then rows, outputs VF, using internal 1 µA source.
Vf values output via SPI.
TEST_M2: Run Pixel Test: LDO in bypass mode, sequentially addresses columns, then rows, outputs VF, using external I source.
Vf values output via SPI.
TEST_M3: LDO in bypass mode, addressing through I2C, using internal 1 µA source, Vf output via I2C.
TEST_M4: LDO in bypass mode, addressing through I2C, using external I source, Vf output via I2C.
BUFFER_SWAP: Swap to/from standby buffer.
COLUMN_NUM: Addresses a specific row.
ROW_NUM: Addresses a specific column.
Output from CMOS chip:
CW_PHIV_MIN, CW_PHIV_AVG, CW_PHIV_MAX: factory measured EOL global luminous flux data.
CW_VLED_MIN, CW_VLED_AVG, CW_VLED_MAX: factory measured EOL global forward voltage data.
CW_SERIALNO: die/CMOS combo serial number for traceability purposes.
TEMP_DIE: Value of Die Temperature.
VF: Value of Vf bus when being addressed with COLUMN_NUM and ROW_NUM.
BUFFER_STATUS: Indicates which buffer is selected.

Various calibration and testing methods for microcontroller assembly 500 are supported. During factory calibration a $V_f$ of all pixels can be measured. Maximum, minimum and average Vf of the active area can be "burned" as calibration frame. Maximum Vf and dVf/dT calibration frames can be used together with measured die temperature to determine actual $V_{LED}$ dynamically. Typically, a $V_{LED}$ of between 3.0V-4.5V is supported, with actual value being determined by feedback loop to external DC/DC converter such as described with respect to FIG. 3.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A LED controller system, comprising:
an LED controller including an image frame buffer able to receive image data;
a standby image buffer coupled to the image frame buffer to hold default image data of a default image;
a sensor processing module to receive and process sensor data to create processed sensor data; and
a decision module to:
make a determination as to whether the processed sensor data is available; and
select, dependent on the determination whether the processed sensor data is available, among use of the processed sensor data and the default image data to be used for image creation; and
an image creation module to create images to be sent to the image frame buffer of the LED controller based on the determination.

2. The LED controller system of claim 1, further comprising an image decoding module connected to the image frame buffer, with the image decoding module receiving image related data via a high speed bus and converting the data into an image.

3. The LED controller system of claim 1, wherein the sensor processing, decision, and image creation module is included in a vehicle control and sensor system.

4. The LED controller system of claim 1, wherein the image creation module is connected to an image coding module, with the image creation module being connected to an image decoding module able to receive image related data via a high speed bus.

5. The LED controller system of claim 1, wherein the image frame buffer can refresh held images at 60 Hz or greater speed.

6. The LED controller system of claim 1, wherein the LED controller used for architectural lighting.

7. The LED controller system of claim 1, wherein the LED controller is used for projected light display.

8. The LED controller system of claim 1, wherein the LED controller is used for street lighting.

9. The LED controller system of claim 1, wherein:
the LED controller is used for vehicle headlamps, and
the sensor data including data selected from ambient light level, time of day, vehicle location, location of other vehicles, road conditions, and weather conditions.

10. The LED controller system of claim 1, wherein the decision module is configured to select as the default image data an initial pattern on vehicle start.

11. The LED controller system of claim 1, wherein the determination to use the default image data is provided to the LED controller through a Controller Area Network (CAN) bus and the determination to use the processed sensor data is provided to the LED controller through a local bus.

12. The LED controller system of claim 1, wherein the LED controller is configured to control sensors that provide the sensor data.

13. A method of interacting with an LED controller system, comprising:
receiving image data using an LED controller including an image frame buffer;
holding default image data of a default image in a standby image buffer coupled to the image frame buffer;
making a determination as to whether sensor data has been received and processed to form processed sensor data, and the processed sensor data is available;
selecting, dependent on the determination whether the processed sensor data is available, among use of the processed sensor data and the default image data to be used for image creation; and
creating images with an image creation module, the images being sent to the image frame buffer of the LED controller based on the determination.

14. The method of claim 13, further comprising decoding image related data received via a high speed bus and converting the image related data into an image.

15. The method of claim 13, further comprising providing in a vehicle control and sensor system to enable sensor data receipt and processing, determining decisions, and creating images.

16. The method of claim 13, further comprising connecting the image creation module an image coding module, with the image creation module being able to receive image related data via a high speed bus.

17. The method of claim 13, wherein the LED controller is used for architectural lighting.

18. The method of claim 13, wherein the LED controller is used for projected light display.

19. The method of claim 13, wherein the LED controller is used for street lighting.

20. The method of claim 13, wherein:
   the LED controller is used for vehicle headlamps, and
   the sensor data including data selected from ambient light level, time of day, vehicle location, location of other vehicles, road conditions, and weather conditions.

\* \* \* \* \*